Patented May 30, 1939

2,160,547

UNITED STATES PATENT OFFICE 2,160,547

PROCESS FOR DECOMPOSING BERYLLIUM MINERALS, PARTICULARLY BERYL

Gustav Jaeger, Neu-Isenburg, and Albert Wille, Frankfort-on-the-Main, Germany, assignors to Deutsche Gold- und Silber-Scheideanstalt vormals Roessler, Frankfort-on-the-Main, Germany, a corporation of Germany No Drawing. Application November 24, 1936, Serial No. 112,614. In Germany December 12, 1935

10 Claims. (Cl. 23—19)

Our invention relates to a process for decomposing beryllium minerals particularly beryl and to the working up into compounds of beryllium of the decomposition products. Such compounds of beryllium are, for instance, beryllium oxide and beryllium salts.

According to known processes beryllium minerals may be decomposed by heating them with alkaline substances such as caustic soda, soda carbonate, lime, or by mean of a fluorine compound such as sodium silico fluoride, sodiumbifluoride or the like.

The decomposition by means of alkaline substances requires the application of relatively high temperatures and, in consequence, considerable consumption of fuel and apparatus which have to be made of expensive materials so that they are capable of resisting the attack of alkali at high temperatures.

When fluorine compounds are employed for the decomposition the beryllium is obtained in the form of fluoride which can be worked up into other kinds of pure beryllium compounds with difficulty only.

According to our invention we decompose the mineral with the aid of sulfuric acid in the presence of a small amount of a fluorine compound. The sulfuric acid utilized is advantageously of high concentration such as, for instance, of 85 to 95 percent. In the place of sulfuric acid bisulfates such as sodium bisulfate or compounds of bisulfates with sulfuric acid, for instance, such as contain three equivalents of sulfuric acid to each one molecule of sodium sulfate may be employed.

As fluorine compounds, for instance, alkali metal fluorides, alkaline earth metal fluorides, hydrogen fluoride or the like come into consideration. The action of the fluorine compounds consists in accelerating the attack upon the beryllium mineral of the sulfuric acid. The amount of fluorine compound necessary for the urfuric acid. The amount of fluorine compound necesary for the reaction of completely decomposing the beryllium mineral may vary within wide limits. In order to obtain the promotion of the sulfuric acid attack we have found, however, that a very small amount of the fluorine compound is sufficient. One tenth to one hundredth of the amount of fluorine which would be necessary for converting the beryllium present into fluoride compound suffice for attaining the result according to our invention.

The decomposition is effected advantageously in a closed vessel, thereby avoiding the sublimation or vaporisation of the hydrogen fluoride as much as possible. The temperatures necessary for carrying through the decomposition may vary between about 250 to 450° C. and lie advantageously at about 300 to 400° C. The duration of the fusion depends largely on the temperature to which the mixture is heated. The decomposition may be effected, for instance, under pressures which may be about 15 to 35 atmospheres.

Since the reaction proceeds with the formation of water when working in closed vessels at high temperatures considerable steam pressure is formed. In some cases we have found it advantageous not to exceed a pressure of 40 atmospheres and to blow off the steam from time to time accordingly.

When crystallized beryl is treated with boiling sulfuric acid or with fused bisulfate or pure sulfate scarcely any attack is observed even after a prolonged treatment. It is therefore surprising that a small amount of fluoride is sufficient to effect the complete decomposition of the beryl by means of sulfuric acid and to obtain the beryllium in the form of soluble salt with excellent yield.

Example 1

360 g. finely ground beryl (ground to a fineness that it passes a sieve with 5000 meshes to the square centimeter) are heated with 320 g. concentrated sulfuric acid (90% $H_2SO_4$) with the addition of 50 g. of calcium fluoride in an autoclave. The heating to 400° C. is continued for four hours whilst the pressure in the iron autoclave is maintained at 35 atmospheres. After that time 92.2% of the beryllium contained in the beryl have been converted into beryllium sulfate. The latter may be transferred into beryllium oxide in the well known way.

Example 2

268 g. finely pulverized beryllium mineral are heated with 432 g. of sodium bisulfate with the addition of 13 g. sodium fluoride to 320° C. for three hours whilst maintaining the pressure at about 20 atmospheres. After this time the total beryllium contained in the beryllium mineral has been converted into soluble beryllium sulfate by this treatment.

The composition products obtained according to our invention may be worked up by the well known methods. For instance, the fusion mass obtained may be leached as such or after previous comminution with water until the mass is exhausted. Hereby a solution is obtained which contains beryllium sulfate, aluminium sulfate, iron sulfate and, if, for instance, sodium bisulfate has been used for the decomposition, sodium sulfate. The solution after having been separated from the insoluble silicic acid may be worked up, for instance, into BeO according to well known methods.

Example 3

The solution obtained by leaching the fusion mixture produced according to the process as described in Example 1 or 2 is treated by adding ammonia after the solution has been filtered from the insoluble silicic acid. By the addition of ammonia, Be, Al and Fe are converted into their hydroxides. The mixture of these hydroxides after it has been filtered off is treated with a solution of ammonium carbonate or sodium bicarbonate in order to extract the beryllium contained therein. The carbonate solution is then boiled until all the beryllium is converted into soluble basic carbonate. This is easily converted after separation into berylliumoxide by heating to a low temperature.

Example 4

In accordance with the method devised by van Oordt the hydroxides are precipitated with the calculated amount of caustic soda and aged at an elevated temperature. By the addition of such a quantity of caustic alkali as is equivalent to the aluminium hydroxyde present the latter is dissolved and separated from the beryllium and iron hydrates by filtration. For the separation of the latter two elements we prefer to convert them into sulfates and subsequently crystallize out the beryllium in the form of $BeSO_4.4H_2O$.

Example 5

To the clear solution obtained by leaching the mixture after fusion ammonia is added. The precipitate formed is filtered off, dried and heated with carbon in a current of chlorine. Thereby these three elements are obtained in the shape of $FeCl_3$, $AlCl_3$ and $BeCl_2$ which may be separated by fractional condensation.

From the beryllium salts obtained by the two latter methods beryllium hydrate may be prepared by dissolving the salts in water and precipitating with OH-ions furnishing compounds. From its hydrate the BeO is prepared by ignition. The sulfate may also be converted directly into the oxide without subjecting the salt to a treatment, which forms the hydrate and separating the hydrate from the solution by immediately heating it to an appropriate temperature. From the chloride the oxide may be prepared by treating it with water and igniting the conversion product thus obtained.

Example 6

In accordance with Pollok the aluminium is precipitated from the leaching solution in the form of ammonia or potassium alum. The separation of the iron from the beryllium may be effected in accordance with one of the methods above mentioned.

We have found that the best way of working up the decomposition product of beryllium minerals consists in separating the iron and aluminium present from the beryllium in a single operation. For this purpose we proceed by leaching the decomposition product obtained in accordance with our invention with water as described above, reducing the ferric sulfate present in the solution into ferrous sulfate by suitable means such as, for instance, sulfurous acid and adding such quantities of alkali metal hydroxide, for instance, NaOH and alkali metal cyanide such as, for instance, sodium cyanide that the beryllium is precipitated as hydroxide whilst the aluminium goes into solution in the form of aluminate and the iron which is present in the ferro state is converted into ferro cyanide which also remains in solution. By filtration the beryllium hydroxide is thus obtained in a pure state and may subsequently be worked into the desired products such as beryllium oxide or beryllium salts.

What we claim is:

1. In a process for decomposing beryllium containing minerals, the step of heating such minerals in a finely divided form with material selected from the group consisting of sulfuric acid, bisulfates and compounds of bisulfates with sulfuric acid in the presence of a quantity of a fluorine compound not more than one-tenth of the quantity which would be required to react stoichiometrically with the beryllium present in the minerals to form beryllium fluoride in a closed vessel while maintaining a pressure in such vessel substantially above atmospheric, to convert the beryllium contained in the minerals substantially to beryllium sulfate.

2. In a process for decomposing beryllium containing minerals, the step of heating such minerals in a finely divided form with sulfuric acid in the presence of a quantity of a fluorine compound not more than one-tenth of the quantity which would be required to react stoichiometrically with the beryllium present in the minerals to form beryllium fluoride in a closed vessel while maintaining a pressure in such vessel substantially above atmospheric, to convert the beryllium contained in the minerals substantially to beryllium sulfate.

3. In a process for decomposing beryllium containing minerals, the step of heating such minerals in a finely divided form with bisulfates in the presence of a quantity of a fluorine compound not more than one-tenth of the quantity which would be required to react stoichiometrically with the beryllium present in the minerals to form beryllium fluoride in a closed vessel while maintaining a pressure in such vessel substantially above atmospheric, to convert the beryllium contained in the minerals substantially to beryllium sulfate.

4. In a process for decomposing beryllium containing minerals, the step of heating such minerals in a finely divided form with a compound of a bisulfate with sulfuric acid in the presence of a quantity of a fluorine compound not more than one-tenth of the quantity which would be required to react stoichiometrically with the beryllium present in the minerals to form beryllium fluoride in a closed vessel while maintaining a pressure in such vessel substantially above atmospheric, to convert the beryllium contained in the minerals substantially to beryllium sulfate.

5. In a process for decomposing beryllium containing minerals, the step of heating such mintrals in a finely divided form with concentrated sulfuric acid in the presence of a quantity of material selected from the group consisting of hydrogen fluoride and fluoride salts of alkali metals and alkaline earth metals not more than one-tenth of the quantity which would be required to react stoichiometrically with the beryllium present in the minerals to form beryllium fluoride in a closed vessel while maintaining a pressure in such vessel substantially above atmospheric pressure to convert the beryllium contained in the minerals substantially to beryllium sulfate.

6. A process for decomposing beryllium containing minerals comprising heating such minerals in a finely divided form with concentrated sulfuric acid in the presence of one-tenth to one-hundredth of the quantity of a fluorine compound which would be required to react stoichiometrically with the beryllium present in the minerals to form beryllium fluoride in a closed vessel while maintaining a pressure in such vessel substantially above atmospheric, to convert the beryllium contained in the minerals substantially to beryllium sulfate.

7. A process for decomposing beryllium containing minerals comprising heating such minerals in a finely divided form with concentrated sulfuric acid in the presence of a quantity of a fluorine compound not more than one-tenth of the quantity which would be required to react stoichiometrically with the beryllium present in the minerals to form beryllium fluoride to temperatures between 250° C. and 450° C. in a closed vessel while maintaining the pressure in the vessel substantially above atmospheric pressure to convert the beryllium contained in the minerals substantially to beryllium sulfate.

8. A process for decomposing beryllium containing minerals comprising heating such minerals in a finely divided form with concentrated sulfuric acid in the presence of a quantity of a fluorine compound not more than one-tenth of the quantity which would be required to react stoichiometrically with the beryllium present in the minerals to form beryllium fluoride to temperatures between 300° C. and 400° C. in a closed vessel while maintaining the pressure in the vessel substantially above atmospheric pressure to convert the beryllium contained in the minerals substantially to beryllium sulfate.

9. In a process for decomposing beryllium containing minerals, the step of heating such minerals in a finely divided form with sulfuric acid in the presence of a quantity of a fluorine compound not more than one-tenth of the quantity which would be required to react stoichiometrically with the beryllium present in the minerals to form beryllium fluoride in a closed vessel while maintaining a pressure in such vessel substantially above atmospheric but less than 40 atmospheres, to convert the beryllium contained in the minerals substantially to beryllium sulfate.

10. A process for decomposing beryllium containing minerals comprising heating such materials in a finely divided form with concentrated sulfuric acid in the presence of a quantity of a fluorine compound not more than one-tenth of the quantity which would be required to react stoichiometrically with the beryllium present in the minerals to form beryllium fluoride in a closed vessel while maintaining the pressure in the vessel substantially above atmospheric, to convert the beryllium contained in the minerals substantially to beryllium sulfate, and treating the resulting decomposition product with water.

GUSTAV JAEGER.
ALBERT WILLE.